INVENTOR
JOSE MARIA BOLAÑO
BY McCarthy, Depaoli & O'Brien
ATTORNEYS

INVENTOR
JOSE MARIA BOLAÑO

BY McCarthy, Depaoli & O'Brien
ATTORNEYS

May 5, 1970  J. M. BOLAÑO  3,509,717

ELECTROMECHANICAL POWER GENERATING MACHINE

Filed Aug. 5, 1968  12 Sheets-Sheet 3

INVENTOR
JOSE MARIA BOLAÑO

BY McCarthy, Depaoli & O'Brien
ATTORNEYS

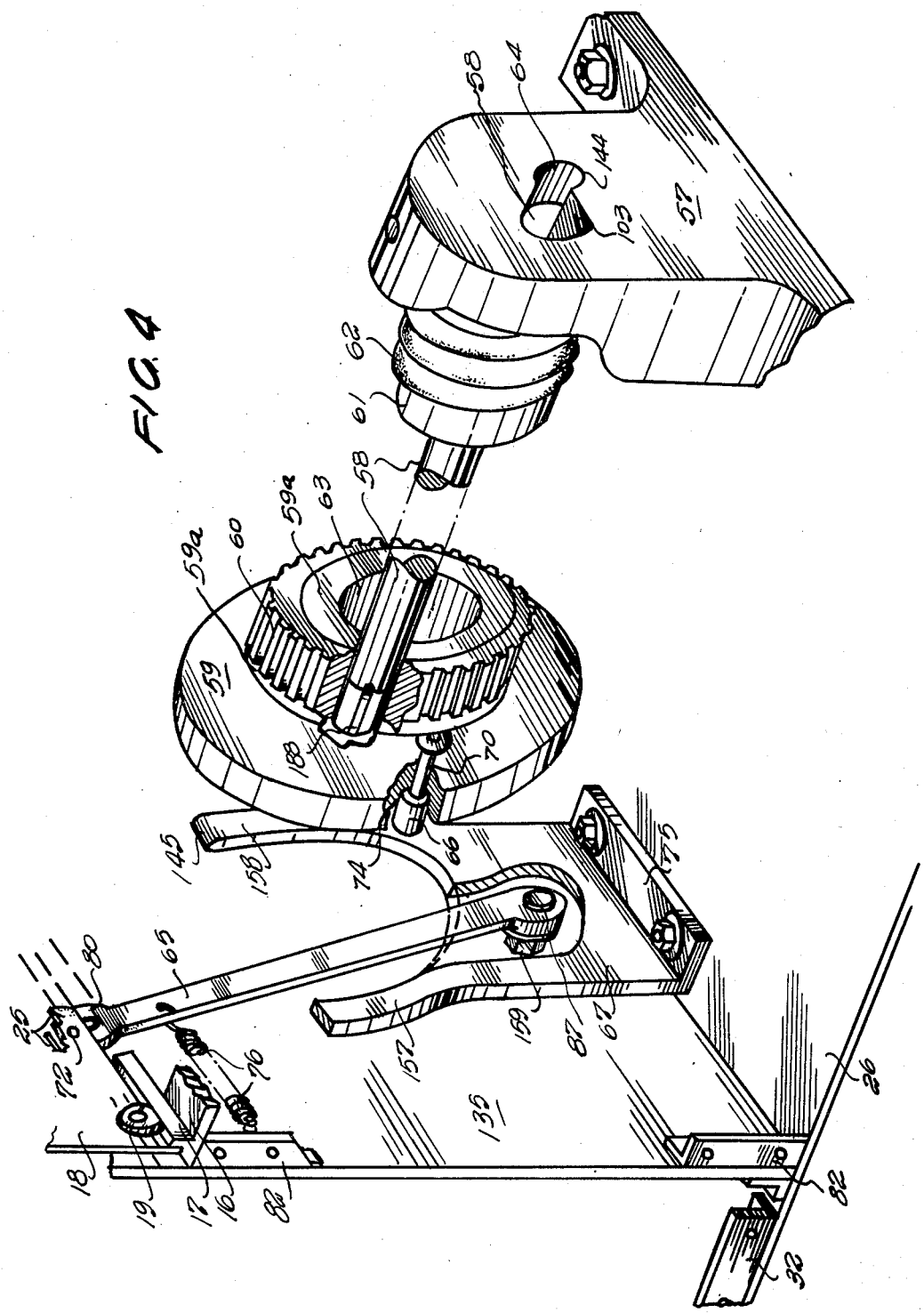

INVENTOR
JOSE MARIA BOLAÑO

BY McCarthy, Depaoli & O'Brien
ATTORNEYS

INVENTOR
JOSE MARIA BOLAÑO

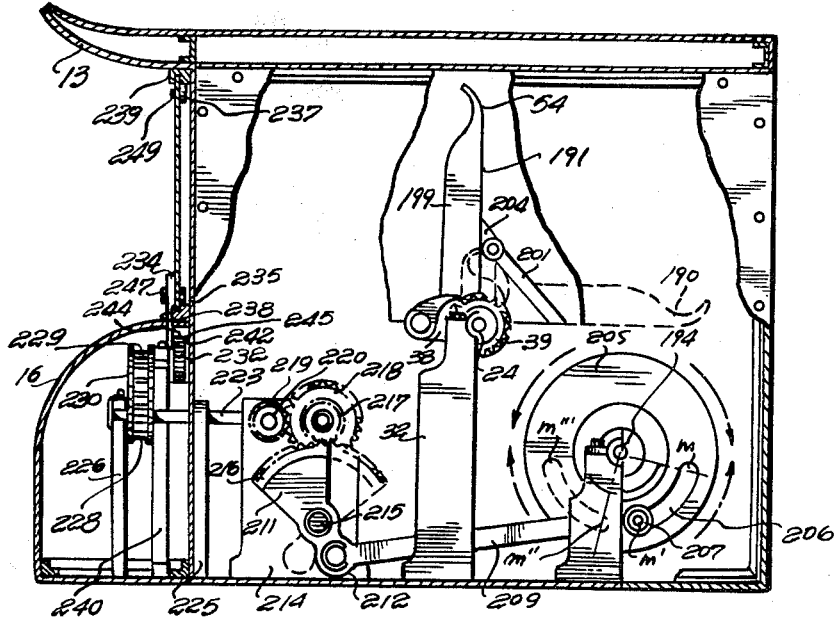

May 5, 1970            J. M. BOLAÑO           3,509,717
ELECTROMECHANICAL POWER GENERATING MACHINE
Filed Aug. 5, 1968                                      12 Sheets-Sheet 10
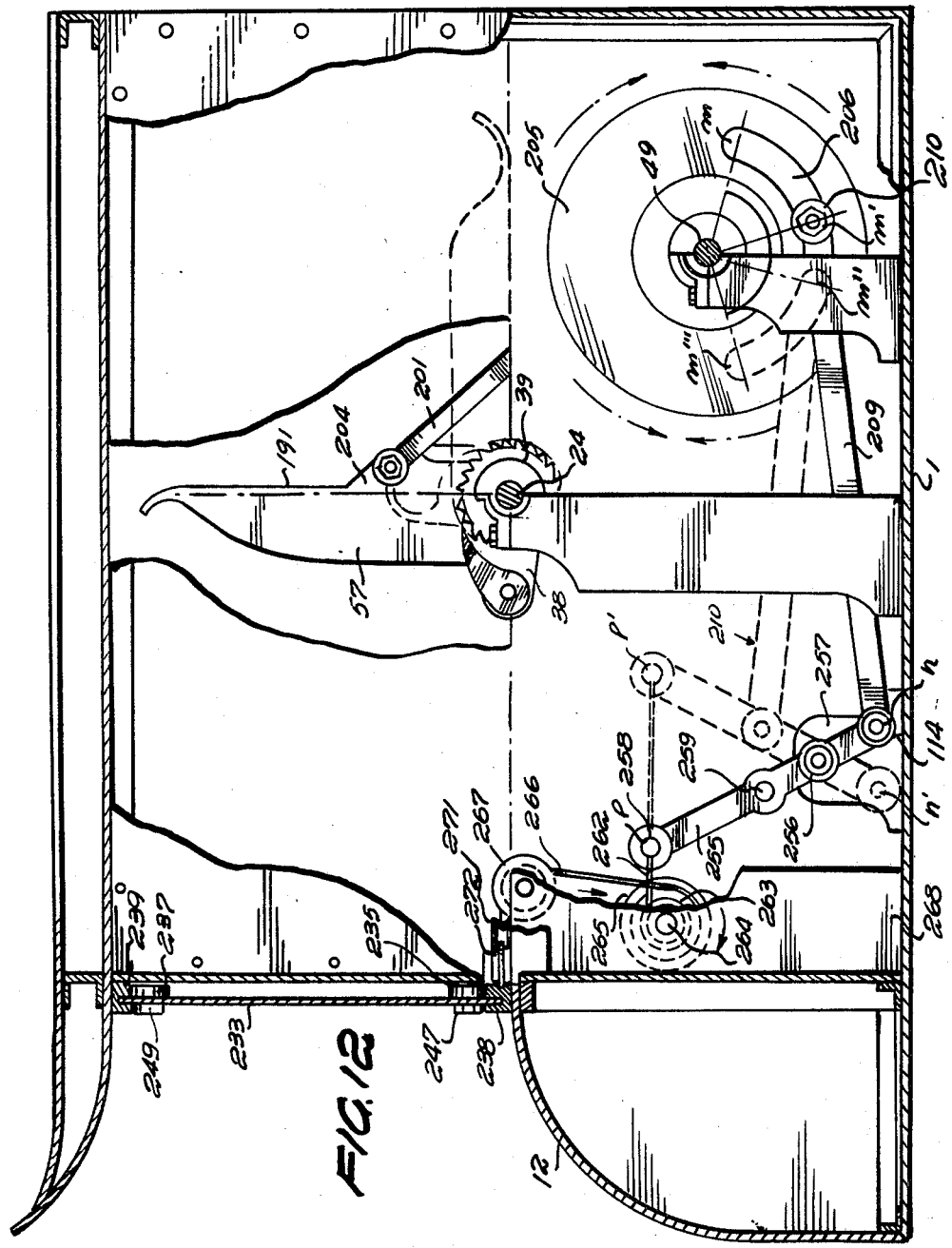
INVENTOR
JOSE MARIA BOLAÑO
BY McCarthy, DePaoli & O'Brien
ATTORNEYS

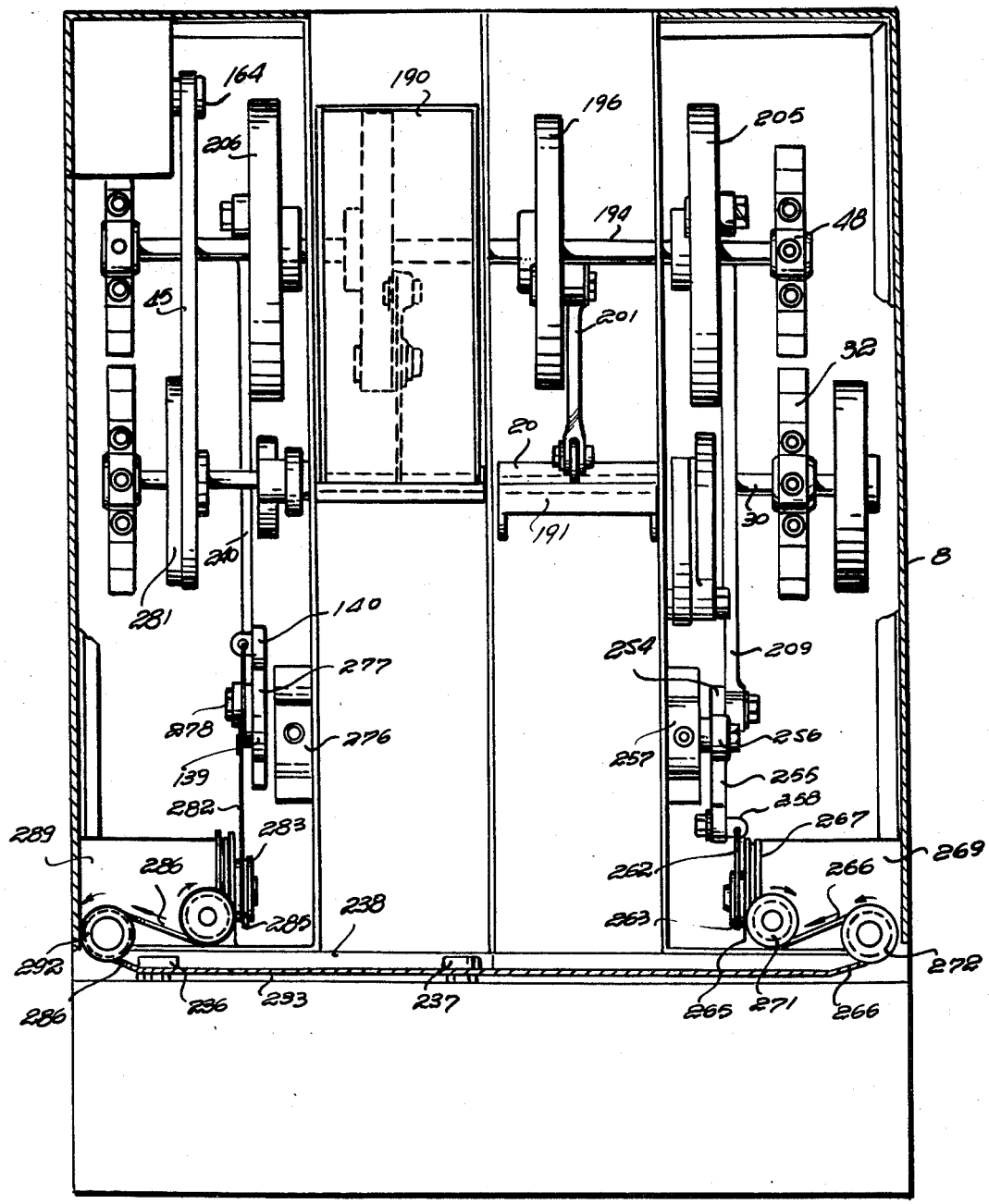

INVENTOR
JOSE MARIA BOLAÑO

United States Patent Office 3,509,717
Patented May 5, 1970

3,509,717
ELECTROMECHANICAL POWER
GENERATING MACHINE
Jose Maria Bolaño, Juncal 824,
Buenos Aires, Argentina
Filed Aug. 5, 1968, Ser. No. 750,171
Claims priority, application Argentina, Aug. 19, 1967,
209,087; Mar. 11, 1968, 212,961
Int. Cl. F03b 7/00; F03d 5/06
U.S. Cl. 60—22                          31 Claims

ABSTRACT OF THE DISCLOSURE

A power generating machine, adapted to be actuated by natural fluid currents and waves, having enclosed fluid driven reciprocating members driving a shaft and gate means for periodically admitting fluid to act on the reciprocating members.

---

This invention relates to a novel electromechanical power generating machine adapted to be operated by natural energetic flows such as wind and, more particularly, river streams and sea waves.

The conventional utilization of wind, river streams and sea waves (which excludes waterfalls and cataracts) has been based on a system of blades fixed to a shaft, which suffer the impulsion irregularities in the production of a mechanical work. The same occurs in the case of devices for utilizing the tides by means of floats.

This invention provides a machine which overcomes in a novel manner the aforesaid drawbacks of the conventional systems by means of dynamic elements acting independently in a free and cyclical, and even alternating, manner on a drive shaft, as will be explained hereinafter, whereby they will not be dragged by an excessive speed of said shaft or delayed by the lags thereof. Thus, upon covering a suitable natural energetic front, a dynamic self-regulation or automatic compensation of the variable speeds or impulses will be obtained, thus solving the problem of producing a regular mechanical-electrical ratio permitting the electro-mechanical constant required for industrial purposes.

In order that the invention may be more clearly understood and readily carried into practice, some presently preferred embodiments thereof have been illustrated by way of example in the accompanying drawings, wherein:

FIG. 4 is a perspective view showing the arrangement of elements enabling the operation of means for interrupting the driving current of the active elements in the machine;

FIG. 10 is a sectional view taken along the lines C—C in FIG. 8;

FIG. 11 is a sectional view taken along the lines B—B in FIG. 8;

FIG. 12 is a view similar to FIG. 11 but showing the arrangement of the closing and opening mechanism by means of cables;

FIG. 13 is a plan view of the interior of the machine having the cable operated closing and opening device.

Figure 1:
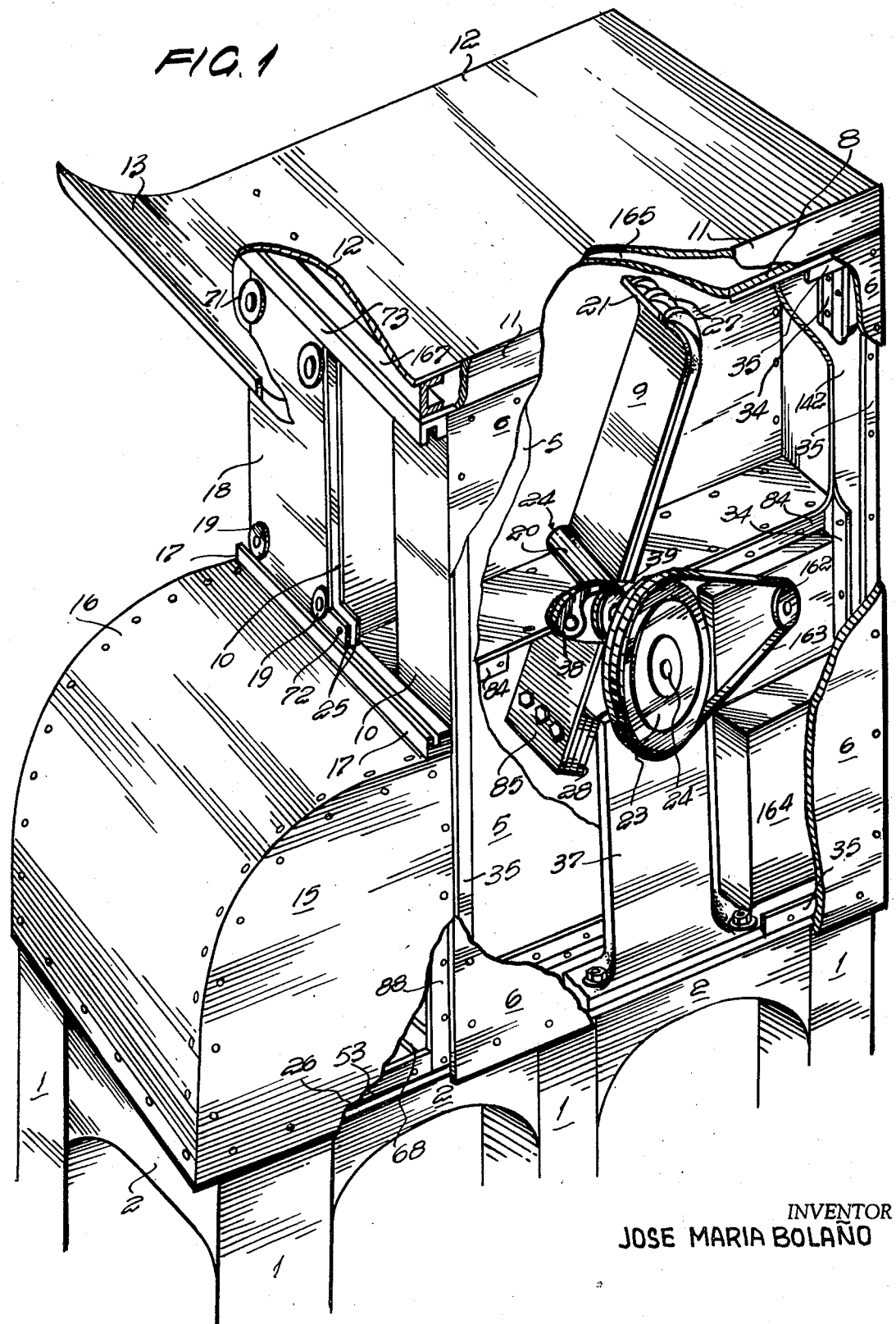
FIG. 1 is a perspective view, partly broken away, of one of the preferred embodiments of the present invention.
Figure 2:
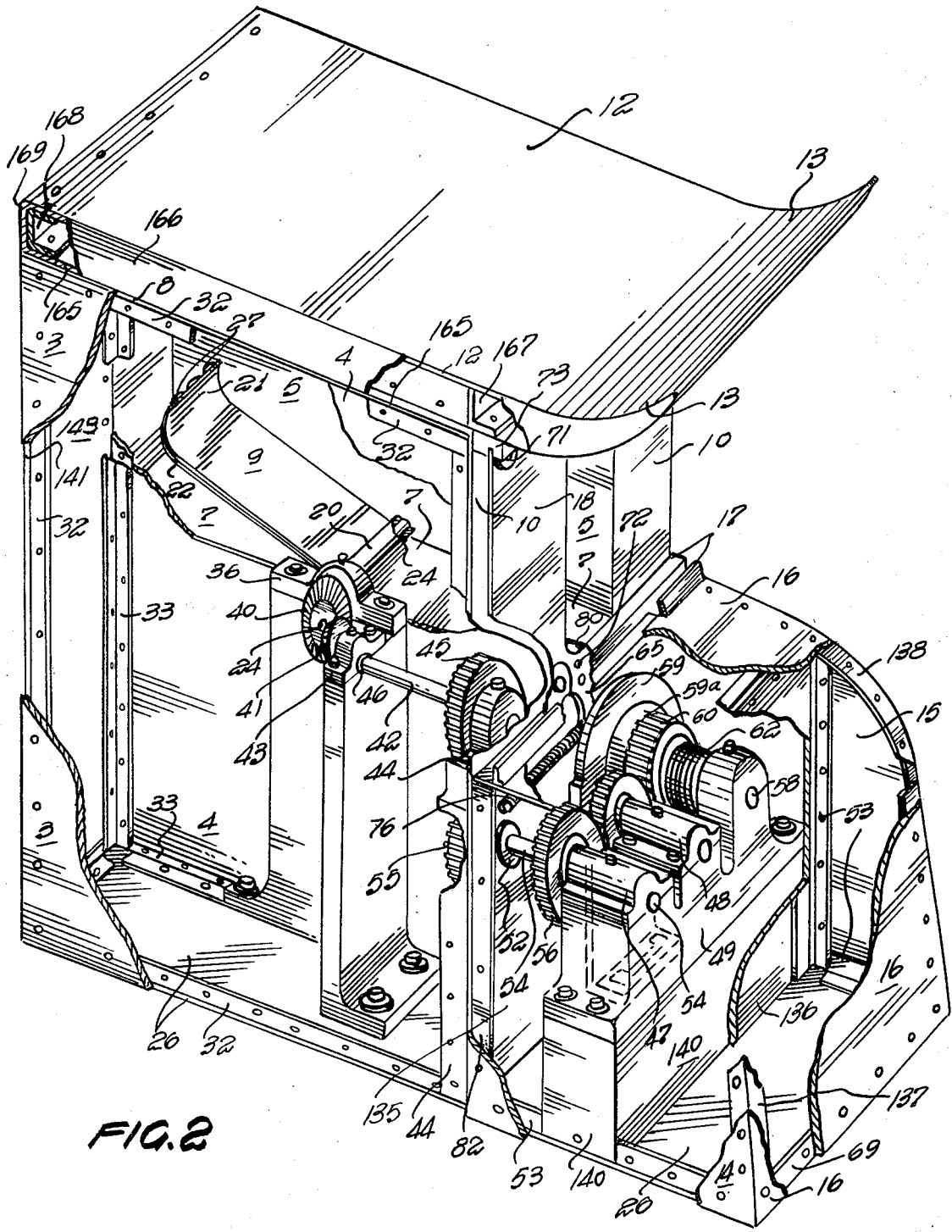
FIG. 2 is a perspective view, also partly broken away, showing further details of the machine illustrated in FIG. 1.

Referring first to the more general embodiment of the machine of the present invention as shown in FIGS. 1 and 2, the machine is installed, as a unit, by means of structures adapted to the different applications thereof and shown as comprising pillars 1 and beams, bracings or ribs 2 supporting the lower plane, surface or base 26 on which the machine is erected. The machine comprises two main parts, viz, the body formed by said base 26 and bounded by the top 8 and side walls 3 and 6, forming a housing or rectangular parallelepiped which is divided by two partitions 4 and 5 parallel to the side walls 3 and 6 and forming therewith three longitudinal compartments which for the sake of briefness will be designated, from left to right, as compartments I, II and III, respectively. The front and rear walls of said parallelepipedic body are equal and U-shaped, so as to close completely the lower half of the front and back thereof, indicated at 135 and 143, also closing the compartments I and III of the upper half of said body by means of the front wall 10 and the rear walls 141, 142, whereby the upper half of the compartment II will remain open at the front and back, in the form of a central passage, between partitions 4 and 5, the top wall 8 and an intermediate wall 7 separating said compartment from the rest of the machine body. The side walls 3 and 6 and the central partition walls 4 and 5 are secured to the top and bottom walls 8 and 26, respectively, by means of angle bars 32, 33, 34 and 35 forming the structural frames and which may be made removable wholly or in part, for example by the use of screws or bolts and nuts. The intermediate wall 7 is secured to the partitions 4 and 5 by means of angle bars 84, in two sections leaving a central space for installing the dynamic element to be described hereinafter. The front walls 10, 135 and rear walls 141, 142, 143 are also connected to the top wall 8 and the base 26 in a similar manner, through said angle bars (FIG. 2).

The other main part of the machine is mounted on the front free surface of the base 26 and is formed by a chamber or housing having a curved wall 16 which is substantially flat at the upper portion at the level of the intermediate wall 7, FIGS. 1 and 2, said chamber being closed entirely by side walls 14 and 15, said walls 14, 15 and 16 being secured to the base 26 and wall 135 by means of an angle bar structure 53, 69, 82, 88, 137, 138, and may also be made removable wholly or in part. A superstructure may be provided over the top wall 8, if desired. As shown in FIGS. 1 and 2, said superstructure comprises two parallel walls 12, 165, assembled by means of a front U or double L bar 167 and a rear similar bar 168, said superstructure extending forwardly and upwardly in a curved portion 13 and being closed by side walls 11 and 166 and rear wall 169.

Figure 3:
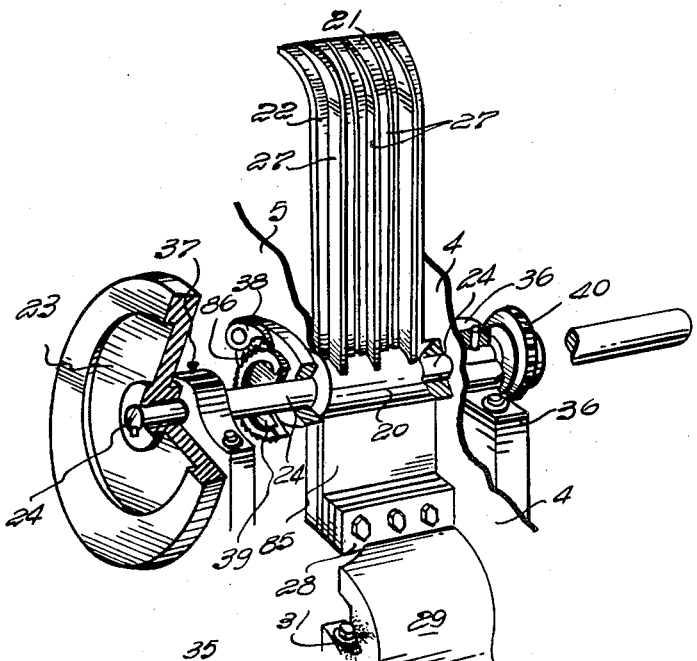
FIG. 3 is a perspective view showing the active elements of the machine according to the present invention.

The dynamic element of the machine is installed in the central passage defined by the partitions 4 and 5, the top wall 8 and the intermediate wall 7, in the free space left between the two sections of the latter and substantially on the transverse axis of the main structure. Said dynamic element (FIGS. 1, 2 and 3) comprise a sleeve or quill 20 adapted to fit over a shaft 24 and having fixed to the upper portion thereof a blade 9 extending across substantially the entire width of said passage, except for the clearance necessary to permit the movement thereof. The blade 9 has an upper arcuate end 21 and the rear surface thereof is reinforced by means of T-shaped wings 22 and webs 27 extending from the quill 20 to the arcuate end 21 and following the shape of the latter. Extending from the quill 20 in a direction diametrically opposite to said blade 9 is a lower arm 85 carrying weights or counterweights 28 removably secured thereto. The drive shaft 24 extends through the quill 20, projects through the partitions 4 and 5 and is supported in bearings 36 and 37. One end of the quill 20 abuts against the partition 4, the other end thereof projecting through the partition 5 for a distance sufficient to mount thereon an eccentric and pawl 38, the latter engaging a ratchet wheel 39 keyed to the drive shaft 24 which also carries fixed thereto a flywheel 23 intended to maintain by its mass the drive of the shaft 24 and to be connected through a tranmission or belt 163 to the pulley 162 of an electric generator indicated at 164.

The devices for driving the shaft 24 which have been described so far are located in the compartment III of the machine, defined by the top wall 8, base 26, partition 5 and side wall 6 and maintained hermetically closed. The other end of the shaft 24 extends through the partition 4 and is supported in a bearing 36, the projecting end of the shaft having keyed thereto a 45° bevel gear 40, FIG. 2. A 45° bevel pinion 41, the number of teeth of which, relative to gear 40, has a ratio of 1:4 and which meshes at right angle with gear 40, is keyed to a shaft 42 which is positioned orthogonally with respect to the drive shaft 24 and mounted in bearings 43 and 44. A toothed wheel 45 is fixed on shaft 42, a clamping ring 46 being provided for adjusting said shaft 42. A toothed wheel 55, keyed to a shaft 54, meshes with the toothed wheel 45. Toothed wheels 42 and 55 are equal in diameter and number of teeth. The aforesaid gear wheels connecting the drive shaft 24 with the shaft 42 and with the shaft 54 are located in the compartment I of the machine, defined by the top wall 8, base 26, side wall 3 and partition 4 and also maintained hermetically closed. The shaft 54 projects through the wall 135 into the front housing formed by the base 26, wall 135, curved wall 16 and side walls 14 and 15, said walls being sealed to the angle bar structure 53, 82, 68, 69, 137 and 138, FIG. 2.

Within said front housing is a gear chamber formed by walls 135, 136, 14, 15 and 16 and within which is a base 140 on which there are mounted bearings 47, 48 and 57, FIG. 2. The projecting end of shaft 54 is supported in the bearing 47. A toothed wheel 56, which may be similar to the toothed wheels 45 and 55 is keyed to the shaft 54 which is adjusted by means of a clamping ring 52. An annular member 59 (FIGS. 2 and 4) has fixedly mounted in a recess 59a thereof a ring gear 60 having the same diameter and number of teeth as the toothed wheel 56, with which it is connected through meshing engagement of both with a pinion 50 mounted on a shaft 51 supported in bearing 48. A pin 66 having a screw-threaded end portion extends through a hole 70 in the annular member 59 and is secured by nut means. The bearing 57, FIG. 4, has a cylindrical projection 61 integral therewith and having a diameter adapted to fit snugly in a central cavity 63 formed in said annular member recess 59a. A shaft 58 is fixed to member 59 by means of a key member 188 and rotates the bushing 144 of bearing 57. A compression spring 62 adapted to act on the ring 59a is fitted about the bearing projection 61. The extent of the projection 61 and the depth of the cavity 63 are calculated to permit advances and retractions, the same as the length of the shaft 58 which leaves a backing space 64, FIG. 4. A projection 74 is provided on the annular member 59, close to the pin 66. The annular member 59, mounted on the projection 61 of bearing 57 and compressing the spring 62, as shown in FIG. 2, bears on a plate member 67, FIG. 4, having a pair of upwardly directed and oppositely arcuate arms 157 and 158 defining therebetween a semi-ring. The lower end of the plate member 67 is provided with a flange 75 secured to the base 26, whereby said plate member 67 is positioned substantially parallel to the wall 135 and spaced therefrom, so as to leave the necessary space for permitting the movement of a lever arm 65 mounted at one end on said wall 135 by means of a supporting bolt 87 and nut 159. The other end of the lever arm 65 is forked as at 80 and engages a pin 72 of a two-wing extension 25 on the lower portion of member 18.

Said member 18 is a slidable door or closure (FIG. 2) having two pairs of lower and upper wheels 19 and 71, respectively, which may be substituted by bolts and nuts. A lower guide 17 is provided on the wall 16, in the corner formed by said wall 16 and the front walls 10, said guide extending across the front of the machine and being formed with a longitudinal groove engaged by the lower edge of the door 18 the wheels 19 of which bear on the front edge of the guide. The upper guide 72 is a rail similar to the guide 17 and is oppositely mounted on the lower face of the structure 12, 13 in the angle formed by the front walls 10, said rail being engaged by the upper edge of the door 18 and the wheels 71 also bearing on the front edge of the guide. Said door 18 is connected with the lever arm 65 by means of the extensions 25 and the pin 72 engaging the fork 80. The lever arm 65 is maintained in its initial position by means of a compression spring 76.

The operation of the more general embodiment of the invention is described above is as follows: FIG. 1 shows the machine practically in position for being started. The sliding door 18 is in open position, thereby opening the central passage defined by the intermediate wall 7, top wall 8 and partitions 4 and 5, said passage being open at the front and rear and channeling the natural energetic fluidic currents (whether aerial, fluvial or marine) directed by the upper and lower curved surfaces 13 and 16, respectively. The open position of the sliding door 18 corresponds to the initial position of the lever arm 65, maintained by the compression spring 76. With the door 18 in open position, the natural fluid flows will act on the blade or paddle 9 which will rotate on the shaft 24 through an angle of approximately 90°. During this angular movement of the quill 20, the eccentric 38 keyed thereto and the pawl thereof, urged by the spring 86 against the ratchet wheel 39 keyed to shaft 24, will cause said shaft 24 and its flywheel 23 to turn through about one quarter of a revolution. FIGS. 2 and 4 illustrate the cyclical work of the machine during each effective movement of about 90° of the blade element 9 and its return to the normal, vertical or balanced position thereof. This movement of the blade 9 causes the rotation of the shaft 24 and, therefore, of the bevel gear 40 keyed thereto and which, during each quarter of a revolution will cause a complete revolution of the bevel pinion 41, which has a teeth ratio of 1:4 therewith. Said 360° rotation of the bevel pinion 41 is transmitted by the shaft 42 to the toothed wheel 45 and through the latter to the toothed wheel 55, said rotation being then clockwise. The aforesaid complete revolution is transmitted by the shaft 54 to the toothed wheel 56, which is substantially similar to the toothed wheel 55. Through the intermediary pinion 50, said complete revolution is in turn transmitted to the ring gear 60, similar to the toothed wheel 56, which will thus rotate in the same direction. During each useful movement of about 90°, the annular member 59, which is actuated by the gear system described above, will rotate anticlockwise through 360° or for a complete revolution. The starting point for the complete revolution of member 59 corresponds to the time at which the projection 74 has moved upwardly to the bevelled end portion 145 of the arm 158 of the plate member 67, i.e., when the pin 66 releases the lever arm 65, leaving same free to the action of the spring 76, after having moved from the extreme left position to the extreme right position, determined by the opening or gap in the sim-ring formed in member 67. As the projection 74 travels throughout the length of the semi-ring, the lever arm 65, through the action of the spring 76, will maintain its extreme left position and, consequently, will hold the sliding door 18 in open position by the fork 80 engaging the pin 72 on the door extension 25. In such position, the above-mentioned channeling passage will remain open, the natural fluid acting on the blade 9 therein and leaving through the rear open end of the passage. When the blade 9 is approximately in the position shown in FIG. 2, and with a suitable construction of the open sector of the semi-ring in the plate member 67, the projection 74 will move free of the arm 157, whereby the annular member 59 will advance on member 67 due to the pressure of the spring 62 and the pin 66 will enter the space comprised between said arm 157 and the lever arm 65 and engage the latter arm, whereby the clockwise rotation of the member 59 will move the lever arm 65 to its extreme right position, overcoming the action of the spring 76, and causing the movement of the sliding door 18 on the wheels and rails thereof until the front inlet end of the channeling passage is closed. Thus, at the end of the useful movement of the blade 9, said passage will become automatically closed to the energetic fluid currents, at which time the passage will be free of pressures, permitting the dynamic element to return to its normal, vetrical or balanced position. At such time the projection 74 will move upwardly on the bevelled end portion 145 of arm 158, the pin 66 being released which in turn leaves the lever arm 65 free to the action of the spring 76 which will return same to its initial position, the lever arm thus opening again the sliding door 18. The duration of the door opening and closing cycle will depend on the extent of the semi-ring, the degree of the opening thereof and also on the width of the door itself, which should be coordinated and synchronized with each other.

Figure 5:
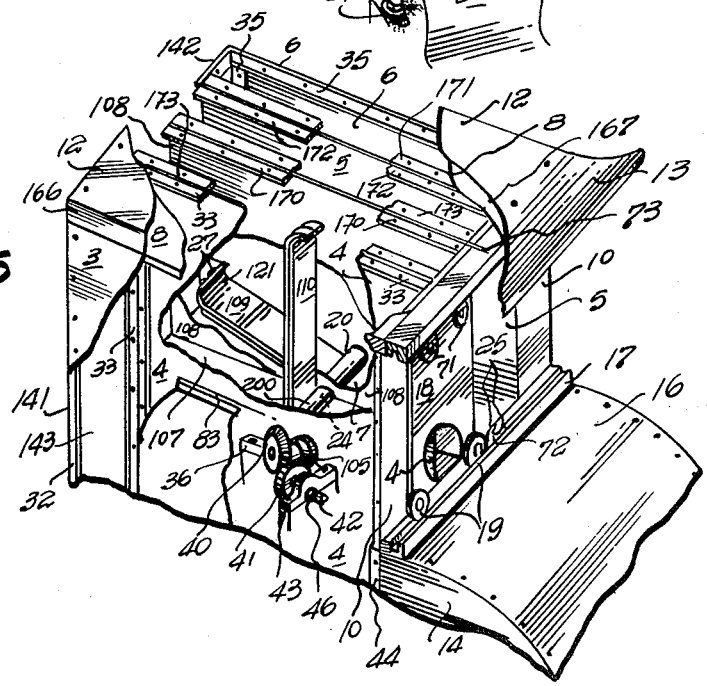
FIG. 5 is a perspective view showing a further preferred embodiment of the machine illustrated in FIG. 1.

The general embodiment of the invention as described so far is also the simplest, inasmuch as the machine has a single dynamic element which drives the entire system. FIG. 5 shows a machine having two dynamic elements mounted on a single shaft 24 and constituting a twin unit. The opening and closing mechanical system is similar to that described above, but this embodiment includes a pair of driving blades 109 and 110, each having a lower arm provided with counterweights, as described in connection with FIG. 3. The blades 109 and 110 are carried by sleeves or quills 20 and 200, respectively, in respective channeling passages of which the right-hand one is defined by the intermediate wall 7 the top wall 8 and the side walls 108 and 5, and the left-hand one is defined by the intermediate wall 107, top wall 8 and side walls 4 and 108, both passages being open at the front and rear ends. The quill 20 carrying the blade 109 abuts against the wall 108 and extends through the wall 5, said outwardly extending portion of the quill having fixed thereto the mechanisms for connecting and disconnecting same with respect to the shaft 24 and which have already been described with reference to FIG. 1. The quill 200 of the dynamic blade 110 is also mounted on the shaft 24 and abuts against the wall 108, the other end thereof extending through the wall or partition 4. The shaft 24 extends through the walls 4, 108 and 5 through the quills of both dynamic blades and is supported in bearings 36 and 37. The projecting end of the shaft bearing 36 has keyed thereto the bevel gear 40 meshing orthogonally with the bevel pinion 41 the shaft 42 of which transmits complete revolutions to the entire system, as explained hereinbefore. Between the bearing 36 and the wall 4, the portion of the quill 200 projecting through the wall 4 carries an eccentric 105 the pawl of which engages a ratchet wheel 106 keyed to the shaft 24, all of these mechanisms being inclosed in a fluid-tight manner within the compartment I of the machine. It will be seen that in this twin unit the connecting and disconnecting mechanisms remain on the outside, at either side of the respective channeling passages. The structure is completed, as shown herein, with angle bars 170, 171, 172, 173 at the top where the top wall 8 is provided and the superstructure 12, 13 is mounted.

The operation of this twin unit is similar to that described in connection with the single unit, inasmuch as it is responsive to the same mechanical system, with a single sliding door, but the result is potentially twice that of the single unit, with the advantage of a continuous drive of the shaft 24 due to the alternative and complementary effect of both dynamic blades 109 and 110. With the sliding door 18 in the position shown in FIG. 5, the right channeling passage is open and the dynamic element blade 109 will be in the same position as described for the single blade in connection with FIG. 2. However, in the twin unit, while the blade 109 is drivingly moved, connected to the shaft 24, the adjacent blade 110 has its passage closed by the sliding door, as shown, whereby due to the absence of fluid mass and through the action of the balancing arm thereof, it will return to its normal, vertical or balanced position, with a return movement of $-90°$ of the aforesaid pawl on the ratchet wheel 106 and, consequently, of the shaft 24. Once the blade 109 has performed its useful movement, the action of the gearing described above will move the device for closing the door 18 of its own passage, from left to right, which will cause the opening of the left-hand channeling passage corresponding to the blade 110. The inflow of the natural fluid current will then act on blade 110 which will perform its useful movement, with the pawl operatively engaging the ratchet wheel 106, in a successive drive of the shaft 24, namely, in a continuous manner relative to the previous movement of the latter shaft. While the blade 110 is actively moved, the gears as described above will maintain the rotation of the annular member 59 which, disconnected from the arm 65 by the pin 66, will leave door 18 free to the action of the spring 76, thus automatically closing the passage corresponding to the blade 110 and opening the passage corresponding to the blade 109, the repetition of the cycle resulting in a continuous drive of the shaft 24.

Figure 6:
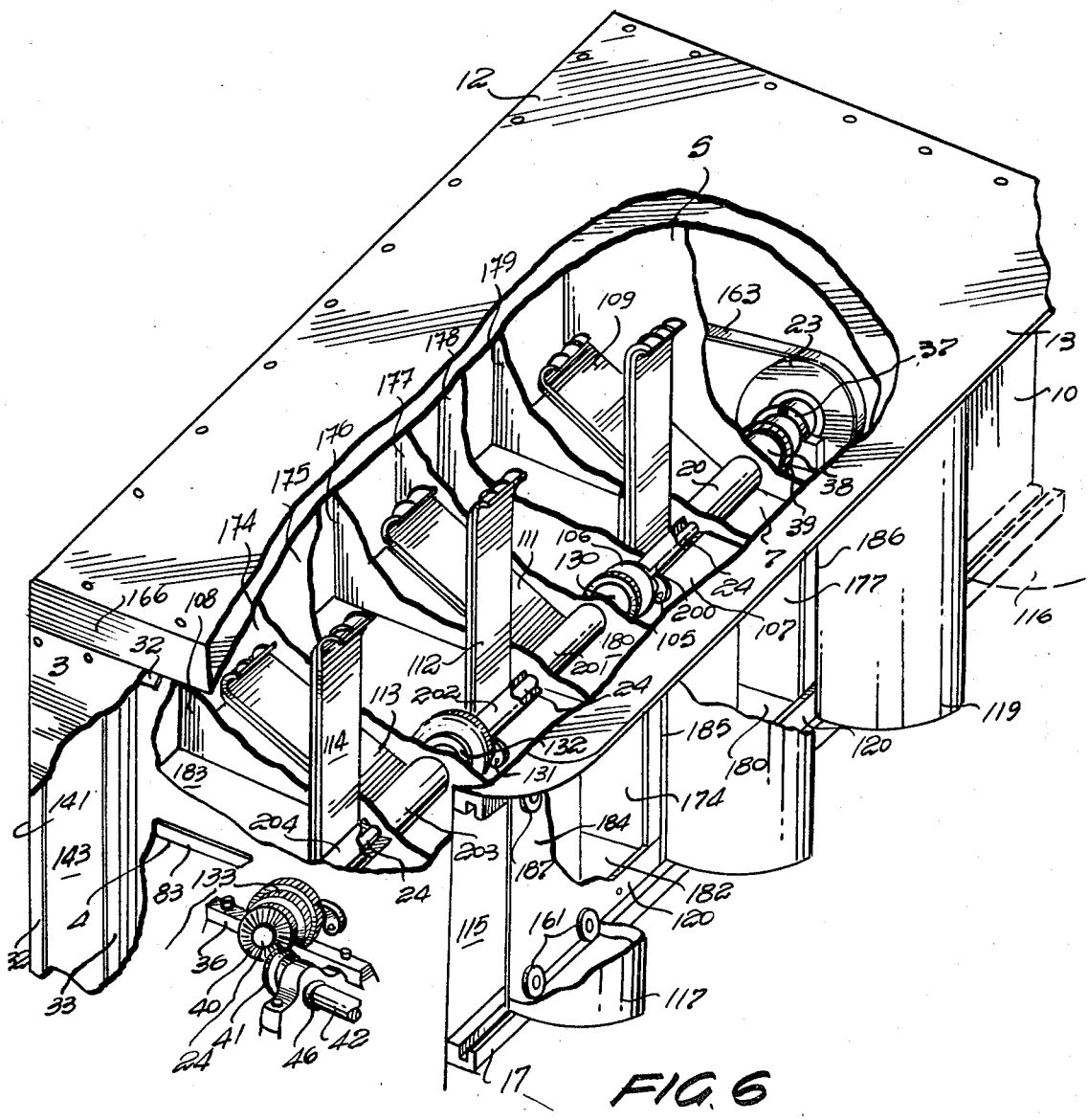
FIG. 6 is a perspective view, partly broken away, of a modified embodiment of the present invention.
Figure 7:
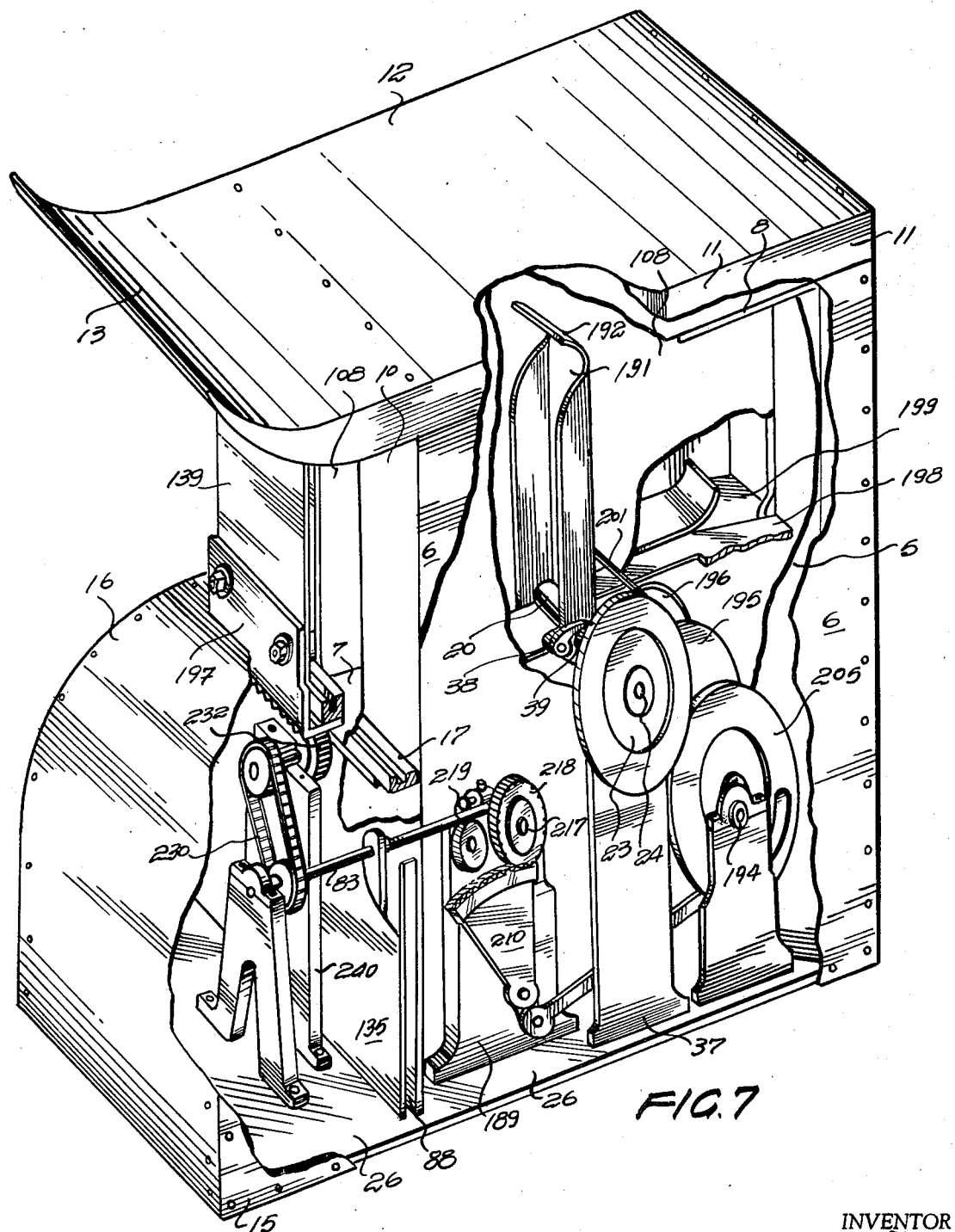
FIG. 7 is a perspective view, partly broken away, showing a modified embodiment of the invention as shown in FIGS. 1 to 6.

The system of the present invention as described above for a machine having only one dynamic element (single unit) or two dynamic elements (twin unit) may be extended, with only a few structural modifications, to a plurality of dynamic elements limited only by size and requirements. FIG. 6 shows, by way of example, a machine having six dynamic elements mounted on one drive shaft 24 common to all of them (multiple unit). The opening and closing mechanism is also similar, but enlarged as required by the machine which comprises three pairs of adjacent channeling passages, similar to the pair shown in FIG. 5, but in the present instance separated by two small parallel-walled housings, one between the first and second pair of passages and the other between the second and third pair. Within the general structure, the enlargement is as follows: between the walls 4 and 5, which are spaced apart for the required distance, and all of them having the same top wall 8, the machine comprises the passages and housings formed respectively by the side walls 4 and 108 and the intermediate bottom wall 183, wherein there is installed a dynamic blade member 114; by the side walls 108 and 174 and the intermediate bottom wall 182, having therein a blade member 113, the blades 113 and 114 being adjacent and having their respective driving mechanisms, designated generally by the reference numerals 132 and 133, arranged outside of the corresponding passages, as shown in FIG. 6. Between the side walls 174 and 175, there is provided a sealed housing between the first pair and the second pair of channeling passages, wherein said driving mechanisms 131, 132 are housed. A blade member 112 is installed between the side walls 175 and 176 and the intermediate bottom wall 181; a further blade member 111 is provided in the passage between the side walls 176 and 177 and the intermediate bottom wall 180, the blade members 111 and 112 being adjacent and having their driving mechanisms 130, 131 located outside of the passages thereof. The driving mechanisms 105, 106 and 130 are located within the sealed housing defined by the base 26, the top wall 8 and the side walls 177 and 178. Finally, the blade members 110 and 109 are located between the side walls 178 and 179 and the intermediate wall 107, and between the side walls 179 and 5 and the intermediate wall 7, the driving mechanisms 105, 106 and 38, 39 for said blade members being housed respectively in the aforesaid intermediate housing and in the right hand compartment III of the machine.

The multiple unit machine requires the use of as many sliding doors as pairs of channeling passages are provided, and all doors should operate in unison, moved by the closing mechanism as described above in connection with FIG. 5. In the embodiment shown in FIG. 6 there are three wheeled doors 184, 185 and 186 movable on rails or guides 17, 73, the lower and upper wheels 161 and 187 of said doors engaging longitudinal grooves formed in said guides, as shown in connection with door 184. Said doors correspond to the three pairs of channeling passages in the order in which they have been described and are in position forming a unit by means of connecting means 120 which join them together both at the bottom, as shown in FIG. 6, and at the top. The door 184 also has an inner extension 25 which with the connecting means 120 supports a pin 126 engaged by the upper forked portion of the lever arm 65 corresponding to the closing and opening device already described above, so that as the door 184 is moved from left to right or from right to left, it will also move the doors 185 and 186. Each door has a member in the shape of an equilateral pointed arch in cross-section, with the middle edge directed forwardly and with the side edges connected to the respective vertical door frame members, as shown in FIG. 6. These members, designated with the reference numerals 117, 118 and 119 are identical and the adjacent curved sides of any two adjacent members will converge towards the alternatingly open passages and will cooperate with the arcuate surfaces 16 and 13 to channel, concentrate and make best use of the natural fluid currents. At the left and right ends of the machine, the above system of "inlets" is completed with fixed members 115 and 116, respectively.

FIG. 6 shows the flywheel 23 with the transmission 163 for starting the electric generator 164 illustrated in FIG. 1 and which is included in all of the embodiments of the present invention.

The multiple unit as described above serves the same purpose as the single unit or the twin unit previously described, with a modification in the mechanical device thereof which may be advantageous in large or heavy machines installed on sea coasts for using sea waves as natural energy-producing fluid. This embodiment is based on the principle of equilibrium between two dynamic elements connected to a shaft, and which can also be extended to a plurality of dynamic elements equally connected, coordinated and synchronized, as shown in FIGS. 7 to 14, inclusive.

In the embodiment shown in said figures, on the drive shaft 24 and within the left-hand channeling passage there is provided a dynamic element comprising a blade 190, and within the right-hand passage there is a similar dynamic element 191, both elements having their blades extending from quills 20 supported by the drive shaft 24 and extending through the walls to side compartments, for a distance sufficient for mounting the eccentric 38 and pawls, the latter engaging the ratchet wheel 39 as in the previous embodiments.

Figure 9:
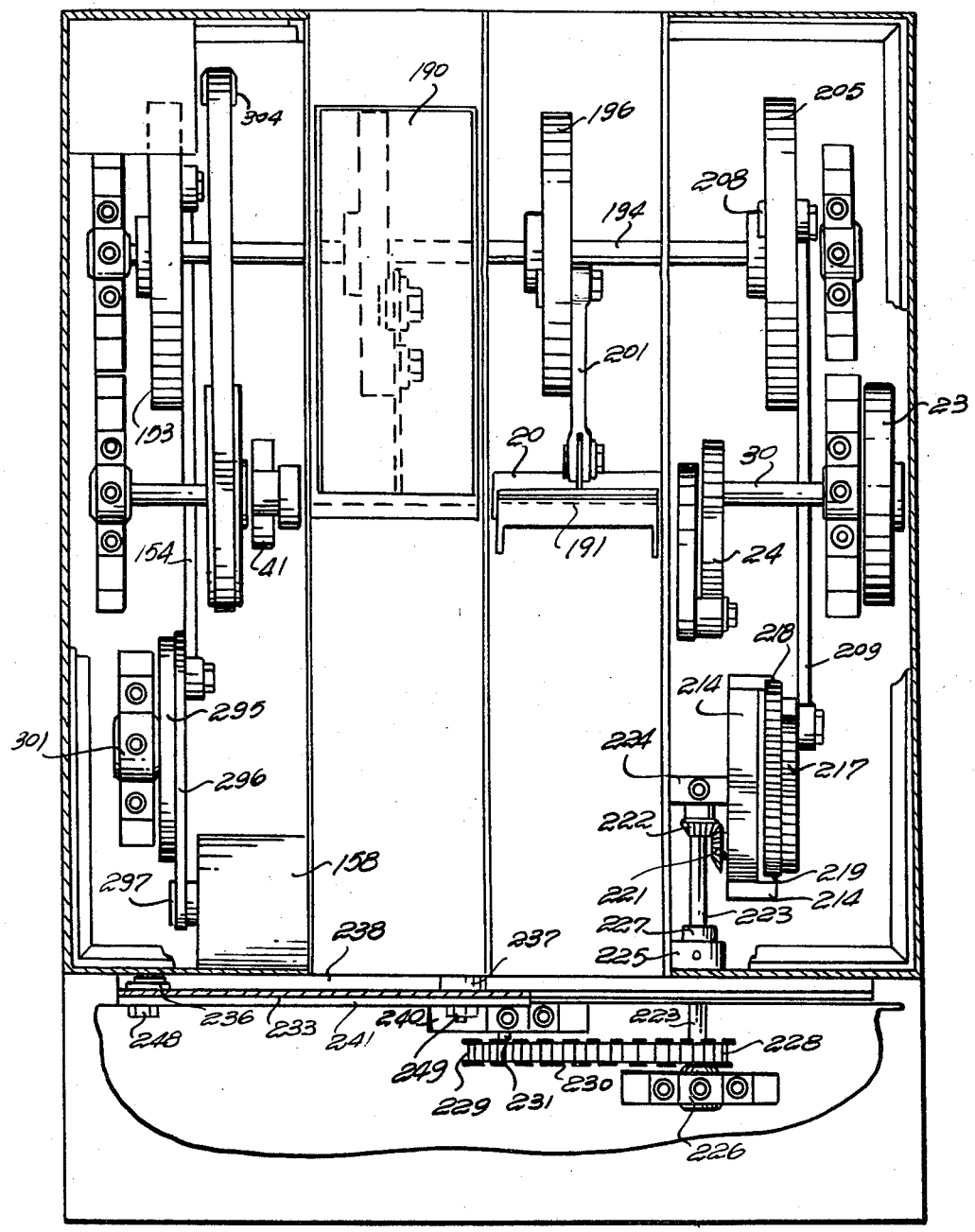
FIG. 9 is a sectional view taken along the lines A—A in FIG. 8.

Arranged parallel to the drive shaft 24 and located at the rear and lower portion of the machine, there is a reciprocating shaft 194 mounted in suitable bearings located in both side compartments, so that the shaft 194 extends substantially throughout the width of the machine, as does the drive shaft 24. Keyed to the shaft 194 are all of the wheels corresponding to the blade reciprocating system, i.e., the wheels connected directly wtih the dynamic elements, which will be termed main wheels, and the secondary wheels. The main wheels 195 and 196 are suitably positioned on the shaft 194 so that they may be connnected through links 200 and 201 to the rear side of the blades 190 and 191, as shown in FIGS. 9, 11 and 12.

Figure 8:
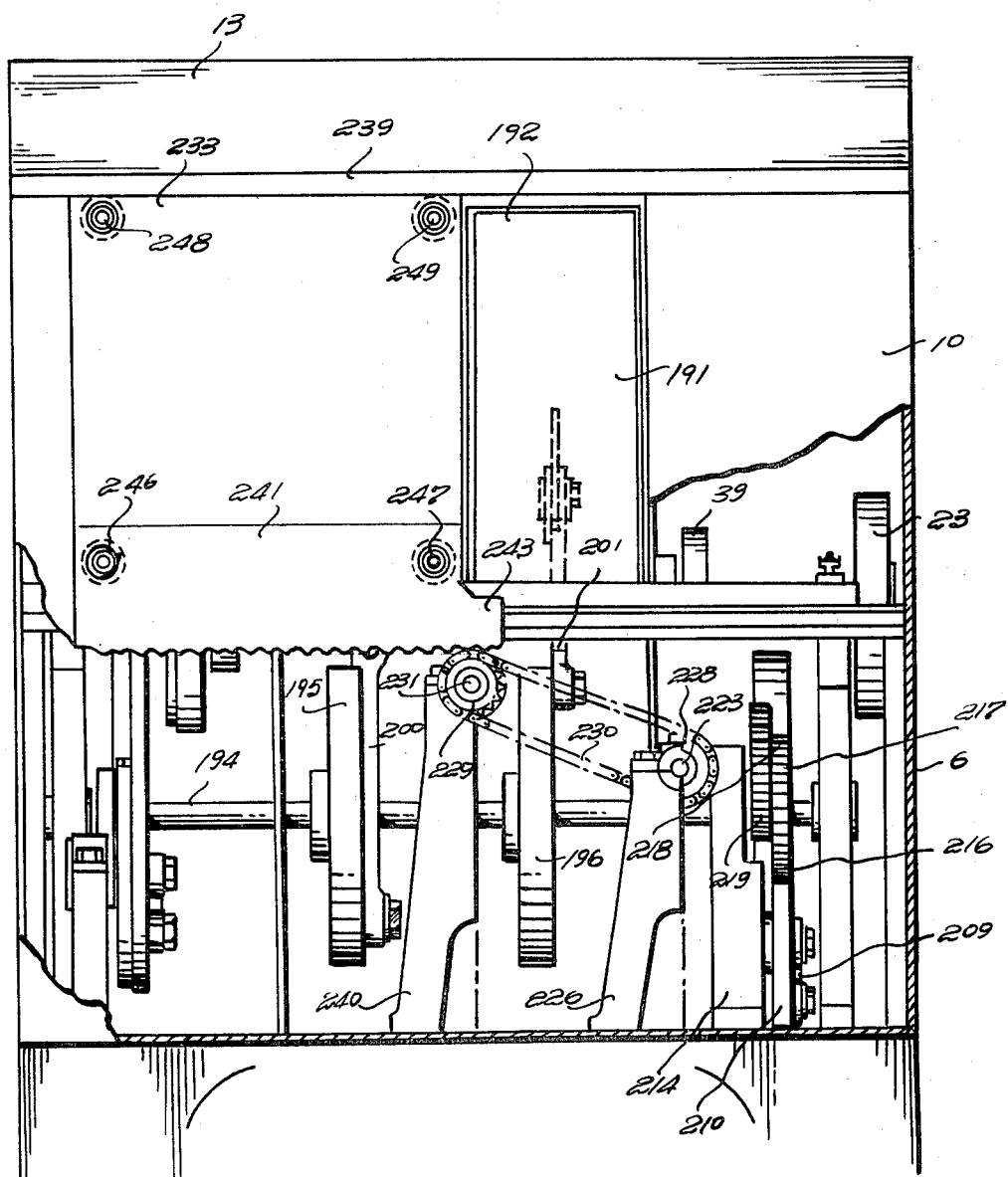
FIG. 8 is a front elevational view, partly broken away to show the internal mechanisms of the machine according to this invention.

FIG. 11 is a longitudinal sectional view of the machine taken along the lines B—B in FIG. 8, clearly showing the interior of the right-hand channeling passage and the connection of the blade 191 with its corresponding main wheel 196, by means of the link or connecting rod 201.

The construction of the blades is characterized by the upper curved portion 192 and 193 thereof and by having right-angled side flanges the width of which decreases gradually towards the curved portion of the blades so as to leave the latter portion free at both sides for a rapid and complete discharge of the contents thereof relative to the outlet slope 198, 199. Intermediate the width thereof, each blade is provided with a perpendicular projection 204 on the back face thereof, positioned at about one third of the length of the blade from the quill thereof. Said projections are formed with holes for coupling a corresponding link 200, 201. The link 201 is shown as applied to the blade 191 which is shown in FIG. 11 in its vertical starting position indicated at $a$, and is connected to the wheel 196 at a point $b$, selected so that the path thereof will follow the same angle of movement as the blade, which is approximately 90°. This angle has been set in order to facilitate the construction of the machine, but may be larger or smaller, as desired. In this manner, when the blade passes from the vertical position shown in full lines to a horizontal position (shown in broken lines in FIG. 11) i.e., when the blade 191 passes from the position $a$ to the position $a'$, the link 201 connected to the wheel 196 will shift the connecting point from the position $b$ thote position $b'$, the points $b$ and $b'$ being separated by an arc of 90° which, being of effective work, is designated by the arrow +90°.

FIG. 11 also shows, in a schematic manner in order to simplify the description, what occurs in the adjacent left-hand channeling passage. By means of a broken away portion in the drawing, the blade 190 is shown in its horizontal position, which corresponds to the vertical position of the blade 191 in the unit comprising a pair of reciprocating dynamic elements. Inasmuch as both blades are equal in construction, the link 200 connecting the blade 190 with the respective wheel 195 is coupled to the corresponding projection and hole which coincides geometrically and practically with the point $a'$. Said link 200 connects the blade 190 with the wheel 195 at the connecting point $c$. The +90° movement of the blade 191 and the resulting shift of the point of application $b$ to the point $b'$ will determine the movement from $c$ to $c'$ through a similar arc. The links 200 and 201 are equal in constructoin and, therefore, at the point $c'$ the blade 190 will return to its vertical position. Both positions of the link 200 are shown in dotted lines in FIG. 11. It will thus be seen that the alternating movement of the two blades is mechanically insured by the coupling, through like links, to the reciprocating wheels at opposite and geometrically determined positions. The two dynamic elements including the blades are connected and in equilibrium with each other by the respective wheels and corresponding shaft, the reciprocating motion being reciprocally transmitted.

The shaft and reciprocating wheel system as described above will add firmness and safety to the dynamic elements of the machine, whereby it is adapted for use in connection with high power natural media. Further, this construction has other advantages, such as the application of the system for operating the passage opening and closing mechanisms in an alternating and synchronized manner as required for the reciprocating elements thereof. Besides the main wheels connected to the blades, the system may include secondary wheels fixed or keyed to the shaft 194 and performing the reciprocating movement of the system. Said secondary wheels are preferably located in the side compartments of the machine, as will be described hereinafter.

FIG. 10 shows the right-hand dynamic element 191 in its normal or vertical position, mounted on shaft 24 provided with a corresponding eccentric and pawl 38 for actuating the ratchet wheel 39. The rear projection 204 of the dynamic element is connected to the link 201 connecting same to its respective main wheel. The shaft 194 carries a secondary wheel 205 the location of which is shown in FIG. 9. Said wheel 205 is provided with an arcuate slot 206 engaged by a roller pin 207, the rear retaining head 208 of which wil permit the coupling of a connecting rod 209. The slot 206 extends for an angle of about 60° from center to center of the end curves theerof, such arc being calculated for a movement of the blade through about 90°. The slot 206 will permit the roler pin 207 to move idle from one end to the other without actuating the connecting rod 209, namely, from the point m to the point m'. At the point m', at which the slot 206 terminates due to the rotation of the wheel 205, the roller pin 207 will abut against the end of the slot and be pushed, along with the connecting rod, the head 208 being shifted from m' to m", at an angle of about 30°, this point marking the termination of the positive movement or rotation through +90° of the secondary reciprocating wheel. During the complete +90° rotation, the lowest point of the slot will then be at the position m''', shown in dotted lines in FIG. 4.

The connecting rod 209 is connected to a toothed sector 211 at the lower end 212 thereof. Said toothed sector is mounted by its center of rotation 213 on a fixed stand 214 by means of a shaft 215 secured to said stand and on which said sector can rotate. The projecting end of the shaft 215 is provided with a retaining means such as a screw-threaded pin and nut, or the like. The toothed crown 216 of sector 211 has an upper radius substantially twice as large as the lower radius, as shown in FIG. 10, so that the crown will have the number of teeth required for an accurate transmission of the movements to be performed. The toothed sector is moved angularly from left to right by the action of the connecting rod 209 when the end or head 208 thereof supported by the roller pin 207, driven by the wheel 205, passes from the position m' to the position m" at the end of its movement within the slot 206, the latter assuming the position shown in dotted lines in FIG. 10. The toothed crown 216 meshes with a pinion 217 applied to a toothed wheel 218 with which it is mounted on a common shaft, forming a reduction gear 217, 218 having a ratio 1:2, so that the toothed crown 216 will have the same number of teeth and module as the pinion 217, so that each complete angular movement of the toothed crown will cause a complete turn of the pinion, and the pinion will in turn cause a complete turn of the toothed wheel 218, doubling the effect thereof. The reduction gear formed by pinion 217 and toothed wheel 218 is suitably mounted on the fixed stand 214, as shown in FIG. 9. Also mounted on stand 214 and meshing with the toothed wheel 218 is a transmission pinion 219 keyed to a shaft 220 extending through said stand 214. The projecting end of shaft 220 carried a bevel gear 221 meshing with a further bevel gear 222 equal in size and having the same number of teeth as gear 221 and mounted on a shaft 223 (FIGS. 9 and 10).

The shaft 223 is disposed longitudinally, parallel to the adjacent partition and supported in bearings 224, 225, and 226, the first two of which are located within the right-hand compartment, whereas bearing 226 is located within the front compartment of the machine; said shaft 223 may be adjusted, if required, by means of a ring 227 as shown in FIG. 9.

Mounted on the portion of shaft 223 located in the front section of the machine between bearing 226 and the rear wall of said section, is a toothed wheel 228 (FIGS. 8, 9 and 10) similar in diameter and number of teeth to the pinion 219 and to a toothed wheel 229 fixed a shaft 231 mounted in bearing 240 (FIGS. 9 and 10). The two similar toothed wheels 228 and 229 are in meshing engagement for transmitting rotary motion through a chain 230. Keyed to the other end of shaft 231 is a toothed wheel 232, similar to toothed wheels 228 and 229 in diameter and number of teeth.

The gear assembly as described above, from the toothed sector 211 to the toothed wheel 232 is arranged for transmitting the rotary motion of the pinion 217, doubled by the toothed wheel 218, to the toothed wheel 232, necessary for causing the alternating opening and closing of the sliding door 233. To this end, the sliding door 233 is provided in both the upper and lower portions thereof with wheels 234, 235 and 236, 237, respectively, shown in dotted lines in FIG. 8 inasmuch as they are on the rear portion of the door, and visible some of them in FIG. 9 and subsequent figures. Said wheels are suitably supported by bolt and nut means 246, 247 and 248, 249 (FIG. 8). Said wheels are arranged to roll on lower and upper guides 238 and 239, respectively, which guides they engage without contacting the lower and upper edges of the door. The lower portion of the door 233 has secured thereto a plate member 241 serving as a reinforcement therefor and which has a downward extension carrying a rack 242 (FIG. 8) provided with a projection 244 engaging a guide member 245 (FIG. 10) positioned immediately under a horizontal supporting beam breadthwise of the machine for a distance sufficient to facilitate the sliding of the door 233 in both directions. The plate member 241 has, at the right-hand side thereof and extension 243, also carrying a rack and having a number of teeth sufficient to retain the toothed wheel 232 (FIG. 10) meshed with the rack, particularly when the door reaches the maximum movement to the left as shown in FIG. 8.

The door 233 is substantially twice as wide as the access opening of either of the two channeling passages, this construction being the most suitable for insuring the full closure of each passage before the other passage is opened, and also affords more time for the corresponding discharge of the fluid mass. This advantage can be obtained by means of the opening and closing mechanism of the present invention, as a part of the novel shaft and reciprocating wheel system.

In a more particular embodiment of the present invention, the opening and closing mechanism includes wire means and a pair of secondary wheels, as shown in FIGS. 12 and 13. FIG. 12 shows the right-hand channeling passage with the corresponding dynamic element including the blade 191 mounted on shaft 24 and the remaining devices and parts already described above. The link 201 coupled to the blade back projection 204 connects the blade 191 with its corresponding wheel in the reciprocating system on shaft 194. FIG. 12 shows the interior of the right-hand compartment of the machine which houses, as in the more general embodiment described above, the secondary wheel 205 having a slot 206 similar to that described hereinbefore. As explained above, the secondary wheel 205 covers a rotary movement of about +90° due to the movement of the blade 191 and its connection with the wheel 196 of the reciprocating system through the link 201. The roller pin 207 is adapted to move within the slot 206, holding the connecting rod 209 inactive until the point m reaches the position $m'$, whereupon the connecting rod 209 will be moved from the position $m'$ to the position $m''$, through an angle of about 30°.

In this novel mechanism applied to the shaft and reciprocating wheel system for the alternating and synchronized opening and closing of the channeling passages, the connecting rod 209 is connected to the lower portion 254 of a member 255 mounted on a stub shaft 256 carried by a bearing 257. Said member 255 comprises two arms, namely, a lower arm with respect to the stub shaft 256, from the geometrical center thereof to that of the connection 254, and an upper arm from said geometrical center of the stub shaft 256 to the point 258 corresponding to a small pin having a through hole therein, as shown in FIG. 13. The upper arm portion of member 255 has substantially twice the length of the lower arm portion, so that when the connecting rod 209 moves the head 210 thereof from the position $m'$ to the position $m''$, the other end thereof connected at 254 will move the lower arm of the member 255 from the geometrical center $n$ to the geometrical center $n'$, and the upper arm through an arc substantially twice as large, from the center $p$ to the center $p'$.

A wire 262 having one end secure dto the pin 258, is wound about a grooved wheel 263 mounted on a common shaft 264 with and firmly secured to a further grooved wheel 265 having twice the diameter of the wheel 263. To the groove of the larger wheel 265 of this reduction assembly is anchored one end of a further wire 266 which is in turn wound about the groove of at ransmission roller 267 positioned in the same vertical plane as the grooved wheel 265, on a supporting structure 268. The upper portion of said supporting structure is provided with a horizontal flange 269 suitable fixed to the walls of the machine. The transmission roller 267 changes the direction of the wire, placing it horizontally as it passes the groove of an idler 271 suitably mounted on the flange 269, whereby the wire 266 will cross to the grooved wheel 272 and thence engage a lower guide 238, and following said guide it will be attached to the slidable door 233 by any suitable means, such as through a hole therein. From the point of attachment to the sliding door 233 to the grooved wheel 265, the wires taut as required for the full sliding movement of the door 233. The grooved wheels and rollers as described above, starting from wheel 265 will lead the wire 266 to the sliding door itself in response to the pull exerted on the wire 262 by the member 255 in a necessary and sufficient degree, i.e., from the point $p$ to $p'$. The distance $p$–$p'$ is one-half of the movement to be performed, for which reason it is doubled by the grooved wheel 265 to correspond to the full travel of the door 233 from the extreme left to the extreme right.

The reverse movement of the sliding door will require, in this particular embodiment of the system, the use of a further device similar to the one described above, located in the left side compartment of the machine and operating in opposite direction, as shown in FIG. 13. This device comprises the secondary wheel 206 the slot of which is engaged by the roller pin on connecting rod 240. In order to pull the cable 282 in the opposite direction, the connecting rod 240 is connected to the upper arm of member 277, at the point 278, so as to move the pin 218 and thereby start the device in a direction opposite to that applied in the case of the right-hand side device, by means of respective grooved wheels 283 and 285 acting as a reduction gear and associating the movement of wire 282 to that of the wire 286 by means of grooved rollers 291 and 292. From the roller 292, the wire passes to the connection with the sliding door 233. The two devices, housed in the right-hand and left-hand compartments of the machine, respectively, are equal in construction and their respective secondary wheels cause the reciprocating movement of the shaft 194, whereby the right wheel will rotate positively through +90° along with the blade 191, thereby closing the passage thereof, whereas the left wheel 206 will return the blade 190 to its normal position.

Figure 14:
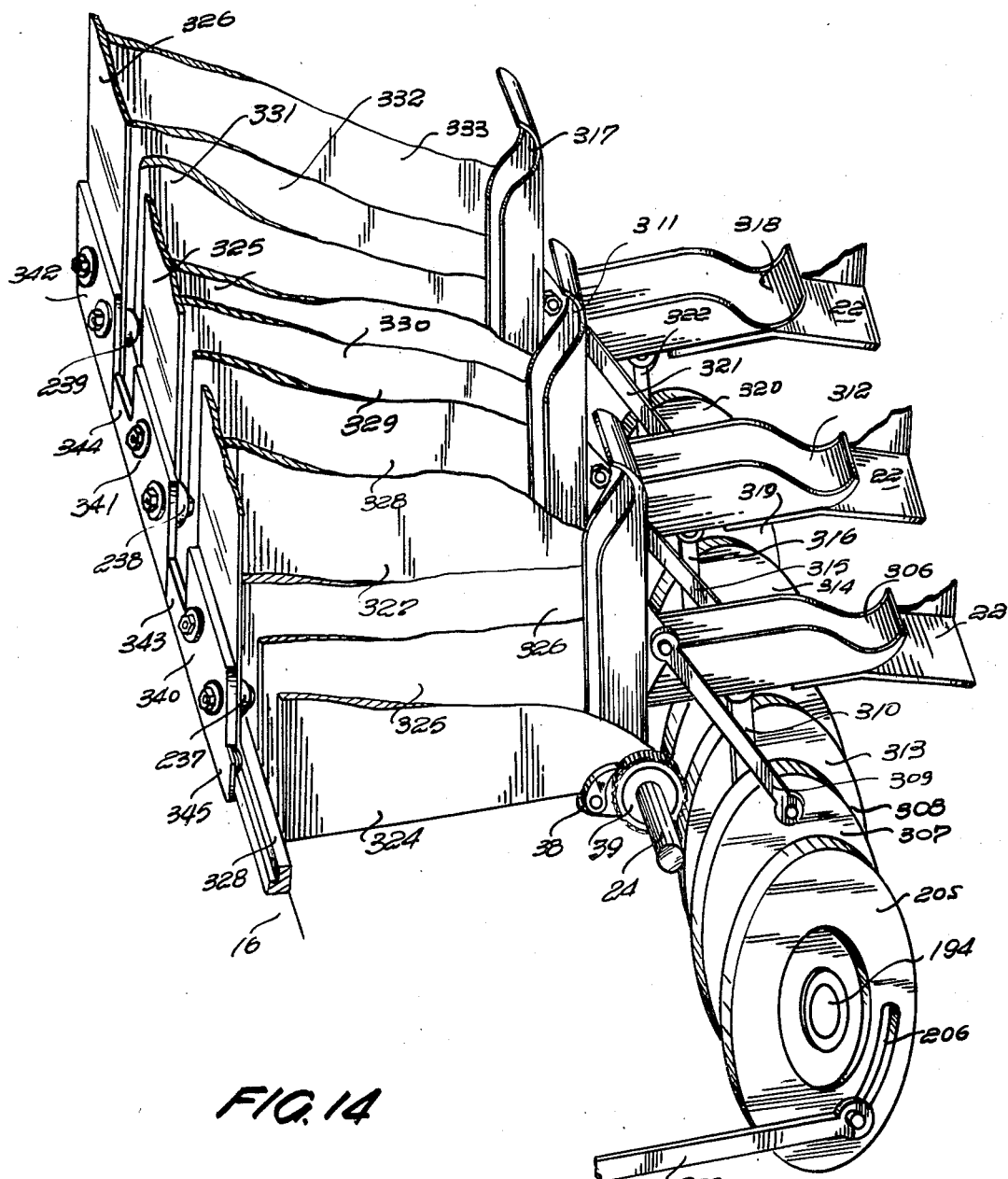
FIG. 14 is a somewhat schematic perspective view showing a plurality of dynamic elements mounted on a common shaft.

FIG. 14 shows schematically a particular application of the present invention to a multiple unit machine. The various original devices of the reciprocating shaft and wheel system have been described in connection with a unit comprising two dynamic elements arranged to be moved alternately with closing and opening of the respective access passages by means of mechanism and drives specially designed to be controlled by secondary wheels mounted on shaft 194, whereby the reciprocating shaft and wheels provides a complete system with the alternating and synchronized opening and closing of the channeling passages.

In the multiple unit, namely a unit comprising a plurality of pairs of dynamic elements mounted on a common shaft 24, the reciprocating shaft system 194 has fixed or keyed thereto a number of main wheels corresponding to the number of blades, alternatingly connected to each other as shown in FIG. 14, which shows a multiple unit for six blades, corresponding to three units of two dynamic elements each. The blade 305 located in the channeling passage formed between walls 324 and 325, with its corresponding driving devices, the shaft 24, the eccentric and pawl 38 and ratchet wheel 39, is connected through its back projection to the main wheel 307, by means of the link 309, in position for starting its useful rotation through +90°. The blade 306 is arranged to alternate with blade 305 and will therefore be in horizontal position, having its channeling passage (between walls 325 and 326) closed and with the link 310 connecting it with the respective main wheel 308 in its −90° extreme lower position. In the same manner, the pair of blades 311, 312 in their respective passages 327, 328 and 328, 329, are connected with respective main wheels 313 and 314 by means of links 315 and 316, respectively; and the pair of blades 317 and 318, in respective passages 330, 331 and 331, 332, are connected to respective main wheels 19 and 320 by links 331 and 332, respectively. The respective mechanisms connecting said pairs of dynamic elements with the shaft 24 are located between the walls 326, 327; 329, 330 and 332, 333 and are not visible in the perspective view of FIG. 14. FIG. 14 shows schematically the alignment of the main wheels on the reciprocating shaft 194, the latter also carrying the secondary wheels 205 provided with slot 206 engaged by the driving connecting rod 209 which may be coupled to any of the opening and closing devices of a multiple unit as described above, for the doors 324, 325 and 326 running on a lower guide 238 and a similar upper guide, by wheels such as 237, 238 and 239, there being two lower pairs and two upper pairs of wheels for each door. Each door is reinforced by means of members 340, 341 and 342, respectively, joined through connections 343 and 344 with a projection 345 for the application of gears providing for the simultaneous opening and closing movement of the entire unit.

Referring now to the unit including two dynamic elements comprising blades 190 and 191, FIGS. 7 to 13, the blade 191 will be in its normal, vertical or balanced position at the time the door 233 is being moved to start the working cycle. The power fluids will enter the channelling passage which is open both at the front and rear ends. Under the action of the fluid stream, the blade 191 will be moved angularly backwards through a positive angle of about 90°. By means of the link 201, said rotation or angular movement is transmitted to the wheel 196 carried by shaft 194. By means of said connection, shaft 194 will rotate through an equivalent of 90° in the positive direction for the blade 191. The secondary wheel 205 fixed also to shaft 194 will perform a like movement. The slot 206 will permit the sliding movement therein of a roller pin or similar means supporting the connecting rod 209, which will be inactive in said slot throughout the extent thereof, of about 60°. At the end of the movement of the slotted portion, the wheel 205 adapted to be mounted on a suitable base and actuated by aerial, fluvial and sea flows, currents and waves, said machine comprising a pair of reciprocating dynamic members having respective active working surfaces acting as blades for receiving the power fluids, each blade being suitably shaped and having reinforcing means, said blades being located and mounted so as to be alternatingly moved angularly, said dynamic members being installed between walls defining adjacent channeling passages, each passage having a front access opening and a rear opening, sliding door means for opening and closing said access openings, a drive shaft, mechanical connecting and releasing means arranged for actuating said drive shaft cyclically during each effective angular movement of said dynamic members, counterbalance means for returning said dynamic members to their normal vertical position, and a synchronized system of mechanisms for alternatingly opening and closing said sliding door means.

9. An electromechanical power generating machine as claimed in claim 8, wherein said sliding door means comprises a pair of doors slidable on guides, and lever arm means associated with said doors and movable through a driving mechanism controlled by said drive shaft.

10. An electromechanical power generating machine as claimed in claim 8, wherein said sliding door means comprises a sliding door in combination with a toothed rack and crown system adapted for moving said door by means of slotted eccentric means controlling said system and associated with said mechanism controlled by said drive shaft.

11. An electromechanical power generating machine adapted to be mounted on a suitable base and actuated by aerial, fluvial and sea flows, currents and waves, said machine comprising a plurality of reciprocating dynamic members having respective working surfaces acting as blades for receiving the power fluids, each blade being suitably shaped and having reinforcing means, said blades being located and mounted so as to be alternatingly moved angularly, said dynamic members being each installed between walls defining a channeling passage having a front access opening and a rear opening, a plurality of sliding doors for opening and closing alternating ones of said passage access openings, a common drive shaft for said plurality of reciprocating dynamic members, mechanical connecting and releasing means arranged for actuating said drive shaft cyclically during each effective angular movement of said dynamic members, counterbalance means for returning said dynamic members to their normal upright position, and a synchronized system of mechanisms for opening and closing alternating ones of said sliding doors.

12. An electromechanical power generating machine as claimed in claim 11, wherein each door is arranged for closing the access opening of one passage and simultaneously opening to access opening of an adjacent passage, and vice-versa.

13. An electromechanical power generating machine as claimed in claim 12, wherein said doors are connected by means of connecting rods with a single lever arm control capable of being driven synchronously by said drive shaft connected to said reciprocating dynamic elements.

14. An electromechanical power generating machine as claimed in claim 13, wherein each of said doors comprises an outwardly pointing equilateral pointed arch-shaped member for channeling the power flows and currents into said reciprocating dynamic member passages.

15. An electromechanical power generating machine as claimed in claim 14, comprising arcuate fluid channeling surfaces above and below said dynamic member passages.

16. An electromechanical power generating machine as claimed in claim 3, which comprises a reciprocating shaft spaced from and substantially parallel to said drive shaft, a main wheel for each dynamic member, fixed to said reciprocating shaft, a link connecting each of said main wheels with one of said dynamic members, arm means alternatingly and oppositely connected to said wheels between each pair of adjacent dynamic members, thereby forming an alternating system connected together by means of said arm means, reciprocating shaft and wheels, associated as balanced members during the alternating reciprocating movements thereof.

17. An electromechanical power generating machine as claimed in claim 16, which comprises secondary wheels mounted on said reciprocating shaft for receiving the alternating motion from said system and converting it into a continuous and regular motion as an additional source of electromechanical power of said reciprocating shaft and main wheel system, simultaneous with and parallel to that of said drive shaft, said secondary wheels being associated with regulating and timing means for governing gear and/or cable motion-transmitting mechanisms for alternatingly and synchronously opening and closing corresponding ones of said channeling passages.

18. An electromechanical power generating machine as claimed in claim 17, wherein said secondary wheels are housed in side compartments of the machine.

19. An electromechanical power generating machine as claimed in claim 17, wherein each secondary wheel has a slot in the shape of an arc of a circle engaged by a slider of a connecting rod having a limited movement within the angular movement of the respective reciprocating dynamic elements.

20. An electromechanical power generating machine as claimed in claim 19, wherein said connecting rod is connected to a toothed sector, said toothed sector being in turn connected to toothed wheels and pinions for transmitting, multiplicating, giving speed, direction and sense of rotation to the devices adapted to be applied to a sliding door for opening and closing the access to said passages.

21. An electromechanical power generating machine as claimed in claim 20, wherein the means for operating said sliding door comprises a pair of sprocket wheels interconnected by a sprocket chain, moved by gear means starting from said toothed sector and regulated thereby, said sprocket wheels meshing with a pinion positioned beneath said door and engaging a toothed rack fixed to said door.

22. An electromechanical power generating machine as claimed in claim 21, wherein said toothed rack is formed at the lower portion of a reinforcing member applied to the lower portion of said sliding door, said sliding door having a width equivalent to substantially twice the width of said channeling passage and being slidable on guide means extending substantially throughout the width of the machine.

23. An electromechanical power generating machine as claimed in claim 16, which comprises a channeling passage opening and closing mechanism in said reciprocating shaft and wheel system, said mechanism comprising in either side compartment of the machine a secondary wheel having a slot in the form of an arc of a circle, a connecting rod having one end slidably engaging said slot, the other end of said connecting rod engaging a member having unequal arms in the form of a lever for pulling a cable engaging the groove of a grooved wheel arranged for that purpose.

24. An electromechanical power generating machine as claimed in claim 23, comprising a grooved wheel device connected to said pulling system, starting from a coupling in the form of a multiplier-reducer and continuing with further grooved wheels for directing a further cable from the multiplication wheel to either the right or left lower portion of said sliding door.

25. An electromechanical power generating machine as claimed in claim 24, wherein said connecting rod moved by said slotted secondary wheel is oppositely connected to said unequal armed member, whereby said sliding door can be alternatingly and synchronously moved in both directions.

26. An electromechanical power generating machine as claimed in claim 16, comprising a mechanism for will drive the connecting rod 209 which will in turn start the passage closing device described above, either in the form of gears or wires, determining the closure of the passage corresponding to the blade 191 during a final movement of wheel 205 through about 30°. While the blade 191 performs its angular movement of 90° and moves the wheel 196 to the same extent, the blade 190 connected to its respective wheel 195 by the link 200 will be raised to its normal or upstanding position by the reciprocating movement of its respective wheel in the opposite direction, through −90°. With the passage for blade 191 closed and the passage for blade 190 open, the operation is repeated in an alternating and cyclic manner. The sliding door or closure 233, of double width, will be alternately moved in both directions in synchronism with the blades, by virtue of its connection with the reciprocating shaft and wheels. In the closing device of the gear type (FIG. 10) the connecting rod 209 will rotate the toothed sector 211 from left to right to assume the position shown in broken lines. This will cause a complete turn of 360° of the pinion 217 and hence of the toothed wheel 218, which rotary motion will be transmitted by wheel 218 to gear 219, bevel gear coupled to shaft 221 and to bevel gear 222, through the shaft 223 of which it will be transmitted to sprocket wheel 228 and through driving chain 230 to sprocket 229 mounted on shaft 231 (FIG. 9) to toothed wheel 232 (FIG. 10) meshing with the rack 242 corresponding to the door 233 and rotating clockwise to close the channeling passage of blade 191 and opening the passage of blade 190. The reciprocating movement of the secondary wheel 205 due to the action of blade 190 on wheel 195 will cause a like and opposite movement, the connecting rod 209 moving the toothed sector in the opposite direction or from right to left, whereby the entire device will cause an anticlockwise rotation of toothed wheel 232 and thus the alternating and synchronized movement of the door in the opposite direction.

In the embodiment using wires for operating the sliding door, two secondary wheels and two similar devices are required, one in each side compartment of the machine, acting in opposite but mutual and synchronized manner, as explained hereinbefore. The right-hand side connecting rod 209 will act by the thrust of member 255, whereas the connecting rod 240, in the reverse operation, will act by the pull of member 277, in view of the symmetrical connection of said connecting rods relative to members 255 and 277. This will produce a reciprocating movement of the respective sets of wires and, therefore, of the sliding door 233, whereby the access passages to the blades will be opened and closed in an alternating and synchronized manner.

The operation of the machine of this embodiment is similar to that described for a unit comprising two dynamical elements in the event of a multiple unit formed by a plurality of dynamic elements acting on a common drive shaft, as shown in FIG. 14, for the sets of blades 305, 306; 311, 312 and 317, 318 and their corresponding main wheels 309, 308; 313, 314 and 319, 320 and respective links. The wheel 205 and its connecting rod 209 controls the closing device for doors 334, 335 and 336 which are connected together and will move in an alternating and synchronized manner on the guides therefor.

The present embodiment, with the novel reciprocating shaft and wheel system, besides solving by the use of new devices the general problem of the machine, both mechanically and functionally, provides an important novelty, namely, a secondary wheel 293, suitably located, will permit converting the reciprocating motion of shaft 194, by means of connecting rod 294, into the circular motion of a wheel 295.

What is claimed is:

1. An electromechanical power generating machine adapted to be mounted on a suitable base and actuated by aerial, fluvial and sea flows, currents and waves, said machine comprising at least one reciprocating dynamic member having an active working surface acting as a blade for receiving the power fluids and provided with bends, projections and curvings, said blade being located and mounted so as to be moved angularly, said dynamic member being installed between walls defining a channeling passage for said flows, currents and waves, a drive shaft, mechanical gear, connection and release means arranged for actuating said drive shaft cyclically during each effective movement of said dynamic member through suitable angles, means for returning said dynamic member to its normal position, and a synchronized system of mechanisms associated with said dynamic member return means for alternatingly opening and closing the access to said channeling passage.

2. An electromechanical power generating machine adapted to be mounted on a suitable base and actuated by aerial, fluvial and sea flows, currents and waves, said machine comprising a pair of reciprocating dynamic members having respective active working surfaces acting as blades for receiving the power fluids and provided with bends, projections and curvings, said blades being located and mounted so as to be moved angularly, said dynamic members being installed between walls defining adjacent channeling passages for said flows, currents and waves and mounted on a drive shaft, mechanical gear, connection and release means arranged for actuating said drive shaft cyclically during each effective movement of said dynamic members through suitable angles, means for returning said dynamic members to their normal positions, and a synchronized system of mechanisms associated with said dynamic member return means for alternatingly opening and closing the access to said channeling passages.

3. An electromechanical power generating machine adapted to be mounted on a suitable base and actuated by aerial, fluvial and sea flows, currents and waves, said machine comprising at least one pair of reciprocating dynamic members having active working surfaces acting as blades for receiving the power fluids the active surface of each blade being suitably shaped and having reinforcing and rib means, said blades being located and mounted so as to be moved angularly, said dynamic members being installed between walls defining adjacent channeling passages for said flows, currents and waves and freely rotatable on a drive shaft, mechanical gear, connection and release means arranged for actuating said drive shaft cyclically during each effective movement of said dynamic members through suitable angles, means for returning said dynamic members to their normal position, and a synchronized system of mechanisms associated with said dynamic member return means for alternatingly opening and closing the access to said adjacent channeling passages.

4. An electromechanical power generating machine as claimed in claim 3, wherein each of said reciprocating dynamic members comprises a counterbalancing arm means diametrically opposite the active surface thereof, said counterbalancing arm means having counterweights.

5. An electromechanical power generating machine as claimed in claim 3, wherein said means for actuating said drive shaft comprises a member coupled to said dynamic member and provided with pawl means engaging a ratchet wheel fixed on said drive shaft.

6. An electromechanical power generating machine as claimed in claim 5, wherein said drive shaft also has coupled thereto a mechanical driving and connecting system for the alternative and synchronized closing and opening of the channeling passage wherein each of said reciprocating dynamic members is arranged.

7. An electromechanical power generating machine as claimed in claim 5, comprising gear means for cyclically engaging and releasing a clutch member for the devices for the alternative and synchronized closing and opening of said channeling passages.

8. An electromechanical power generating machine converting the alternating motion of said reciprocating shaft and wheel system into a continuous and regular rotary motion, said mechanism comprising a secondary wheel fixed to said reciprocating shaft and a connecting rod having one end applied to a wheel adapted for rotating within a given radius for taking care of a minimum oscillation of said reciprocating wheel as caused by the channeling passage opening and closing mechanisms.

27. An electromechanical power generating machine according to claim 26, which comprises a rotary wheel, a radial slot in said secondary wheel engaged by a roller mounted on said one end of said connecting rod for absorbing oscillatory differences in the reciprocating movement, between the minimum and maximum oscillations of the system, said rotary wheel comprising a transmission to a generator.

28. An electromechanical power generating machine as claimed in claim 16, wherein each reciprocating dynamic member comprises a blade member having box-like side walls fitting between the walls of the channeling passage, said side walls decreasing in height towards the upper portion of the blade member so as to leave an outlet for the fluid masses at the end of the effective angular movement thereof, the back side of said blade member having a central projection approximately on its lower third portion, and an opening in said projection for coupling said link connecting said blade with the respective main wheel, said dynamic member acting on said drive shaft through connecting and releasing means.

29. An electromechanical power generating machine as claimed in claim 28, which comprises a casing housing said machine and including lower and upper walls, an intermediate wall between said lower and upper walls, said intermediate wall being cut away for allowing the passage of said links and having a sloping outlet portion for facilitating the discharge of the fluid masses driving said dynamic member.

30. An electromechanical power generating machine as claimed in claim 16, which comprises a plurality of reciprocating dynamic members alternatingly connected through said links to the respective main wheels, said dynamic members being mounted on a common drive shaft, with corresponding passage opening and closing devices controlled by secondary wheels mounted on siad reciprocating shaft.

31. An electromechanical power generating machine as claimed in claim 30, which comprises a sliding door for each pair of dynamic members, said doors being connected together so as to simultaneously open and close alternating ones of said channeling passages.

References Cited

UNITED STATES PATENTS

| | | | |
|---|---|---|---|
| 915,153 | 3/1909 | Beaudette | 253—6 |
| 945,701 | 1/1910 | Courtright | 253—17 X |
| 1,015,627 | 1/1912 | Master | 253—14 |
| 1,960,622 | 5/1924 | Du Pont | 253—6 |
| 2,566,447 | 9/1951 | Griswold | 253—4 |

FOREIGN PATENTS

| | | |
|---|---|---|
| 503,235 | 5/1954 | Canada. |
| 498,896 | 11/1919 | France. |

EVERETTE A. POWELL, JR., Primary Examiner

U.S. Cl. X.R.

416—79, 170

UNITED STATES PATENT OFFICE
CERTIFICATE OF CORRECTION

Patent No. 3,509,717            Dated May 5, 1970

Inventor(s) Jose Maria Bolano

It is certified that error appears in the above-identified patent and that said Letters Patent are hereby corrected as shown below:

Column 2, line 70, "comprise" should be -- comprises --.

Column 3, line 37, "Toothed wheels 42 and 55" should be -- Toothed wheels 45 and 55 --.

Column 5, line 3, "sim-ring" should be -- semi-ring --.

Column 11, line 24, "dto" should be -- to --.

Column 11, line 30, "ransmission" should be -- transmission --.

Column 12, line 38, "19" should be -- 319 --.

Column 18, line 11, "siad" should be -- said --.

SIGNED AND
SEALED
OCT 13 1970

(SEAL)
Attest:

Edward M. Fletcher, Jr.
Attesting Officer

WILLIAM E. SCHUYLER, JR.
Commissioner of Patents